Dec. 24, 1940.  F. RAUCHFUSS  2,225,658
KITCHEN AND LIKE UTENSIL
Filed Feb. 11, 1937
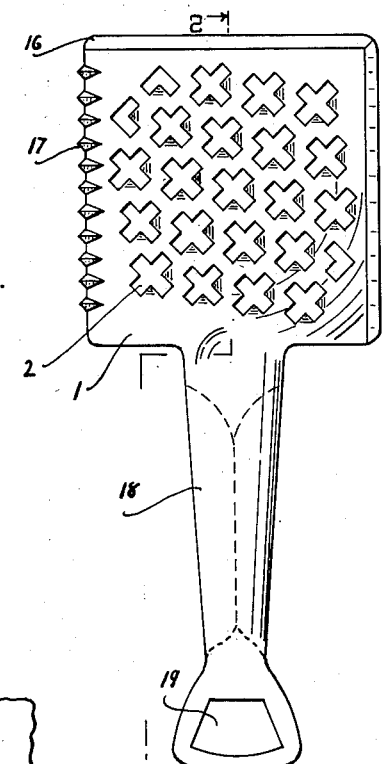
Fig.1.
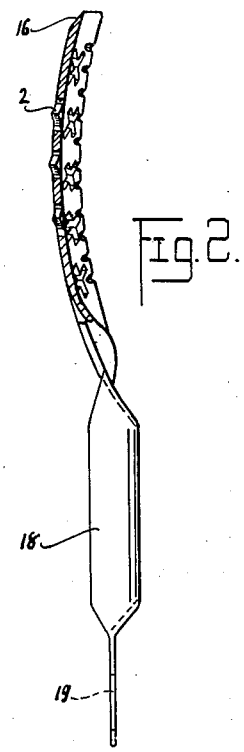
Fig.2.
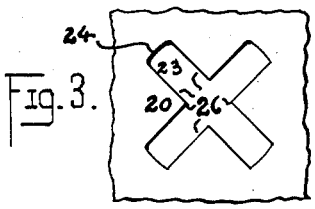
Fig.3.
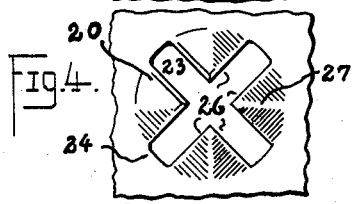
Fig.4.
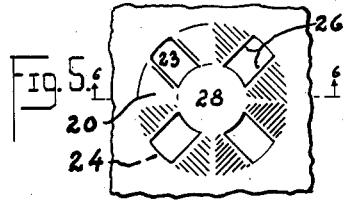
Fig.5.
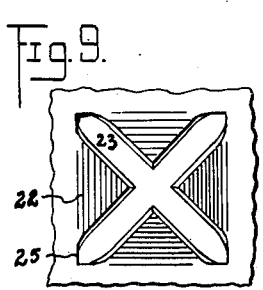
Fig.9.
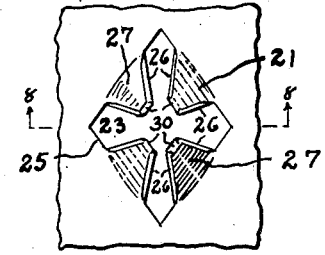
Fig.7.
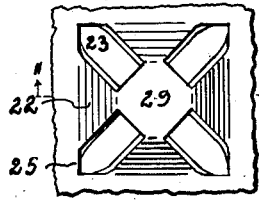
Fig.10.
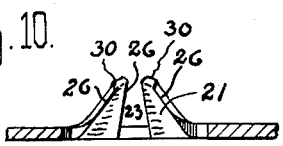
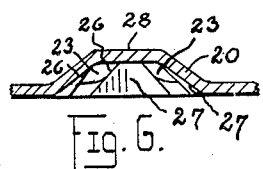
Fig.6.
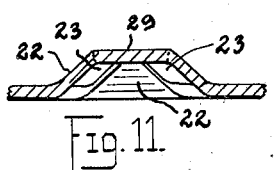
Fig.11.
Fig.8.
INVENTOR:
FRANZ RAUCHFUSS
BY
ATTORNEY Patented Dec. 24, 1940

2,225,658

UNITED STATES PATENT OFFICE 2,225,658

KITCHEN AND LIKE UTENSIL

Franz Rauchfuss, Bitterfeld, Germany

Application February 11, 1937, Serial No. 125,185
In Germany February 11, 1936

1 Claim. (Cl. 146—180)

This invention relates to a kitchen utensil primarily intended as a means for comminuting articles of food and the like, but also adapted for use in other household operations. The utensil is simple and cheap to manufacture and yet exceedingly efficient and easy to manipulate and to clean.

The invention consists essentially in the provision of a sheet metal body which is stamped or otherwise formed with apertures the edges of which are either sharpened or left as originally formed and adapted to serve as grating elements. Any suitable heavy or light metal or metal alloy may be employed in making the utensil. The latter may be flat, arched, cylindrical, or prismatic, and it may be provided with a handle.

It is possible to use the utensil simultaneously for grating and cutting. The cutting edges of the apertures are preferably disposed in an oblique position relative to the grating direction in order to obtain a good grating effect without much resistance. The apertures may be triangular, square or polygonal but it is also possible to use apertures of round, oval or other non-angular shapes. By the use of apertures of stellate or cruciform shape, the cutting edges will be made longer and the efficiency of the utensil increased.

There is little advantage in forming the apertures with abruptly raised edges, since thereby the cutting effect is reduced, but a slight setting off of the edges or lips from the supporting surface is of advantage. By thus setting off, facet-like, the parts within and immediately surrounding the apertures, the grating effect will be greatly promoted. The setting off or bending of the edges can be carried out at both sides of the apertures in the grating direction, and if this is done at different degrees, different grating effects will be obtained by moving the material or the grater either in one or the other direction. In the case of starshaped apertures, the inwardly directed points may be slightly bent up from the grater surface.

A further improvement in the grating effect will be obtained if the offset edges are sharpened so as to act as knives. This applies particularly to the edges of the stellate or cruciform apertures.

Such offset and sharpened edges, particularly when they are pointed, are dangerous to the operator. The danger can, however, be diminished or eliminated by the provision of suitable finger guards. Such guards may be obtained by stamping the stellate or cruciform apertures so as to leave a central, offset portion to which the points of the inwardly converging elements can remain connected.

By means of such a utensil all the important cutting, grating and crushing operations which occur in a household, particularly in the kitchen, can be easily carried out. The grater can conveniently be used for the scaling of fish as well as for lifting fish and the like out of a cooking vessel. Usually the utensil will be provided with a handle. This can be made from the same material as the utensil itself, it may be formed into a roll or otherwise strengthened. As an alternative the handle may be composed of wooden parts secured in position by screws or the like. At the free end of the handle a suspension aperture is formed, and this aperture may be made so that the handle can be used as an opener for bottles provided with crown stoppers.

When thin metal is used in making the utensil, the latter is provided or formed with suitable reinforcements such as ribs or the like. The stability of the device can also be ensured by giving it an arcuate form. In this form the grater can be advantageously used for crushing purposes. The edges of the utensil may be sharpened entirely or partly for cutting, chopping, scraping, scratching and like purposes. One of the edges may be formed with teeth, for instance for cutting tomatoes, and it may be zigzagged for cutting carrots and the like into fancy shapes.

In the accompanying drawing the invention is illustrated by way of example and without restricting the device to the actual shapes shown therein.

Fig. 1 is a view of a kitchen utensil constructed according to the invention.

Fig. 2 is a longitudinal section thereof.

The remaining figures illustrate modifications concerning the apertures, by which the utensil is perforated, and the shape applied to the material which surrounds said apertures and extends thereinto:

Fig. 3 shows a top view of an aperture in the shape of a diagonal cross circumscribed by a circle.

Fig. 4 shows a like view of a similar embodiment, in which the reentering portions are struck up and sharpened.

Fig. 5 shows a similar embodiment in a like view, in which the struck up portions are interconnected by a center piece.

Fig. 6 shows a corresponding cross-section taken in Fig. 5 at a line and in a direction designated by an arrow and the numeral 5.

Fig. 7 is the top view of another modification, in which the cross-sectioned aperture is circumscribed by a diamond, and the struck up, sharpened portions are dull at their points.

Fig. 8 is a corresponding cross-section taken in Fig. 7 at a line in a direction designated by an arrow and the numeral 8.

Fig. 9 is a top view showing an aperture in the shape of diagonal cross circumscribed by a square. The reentering portions are struck up but not sharpened.

Fig. 10 shows a similar embodiment in a like view, the struck up portions being here interconnected by a center piece.

Fig. 11 shows a corresponding cross-section taken in Fig. 10 at a line and in a direction designated by an arrow and the numeral 11.

Similar numerals refer to similar parts throughout the various views.

The utensil comprises a sheet metal body 1 formed with apertures, the edges confronting the apertures serving as grating elements. The apertures may have the form of lozenges 2, as it is shown in the modifications of Figs. 1 and 2; or they may be shaped as triangles, polygons and irregular geometrical figures, or stars or crosses, as illustrated by the remaining figures. In the case of stars and crosses the circumscribing outlines may be derived from fundamental shapes like triangles, quadrangles, polygons, circles, ellipses or ovals.

The portions reentering the apertures are preferably pointed, and may, like the outer edges of the apertures be upset, struck up or bent out from the supporting surface, as illustrated in Figs. 4, 5, 7, 9 and 10. The reentering portions may extend to each other and be spaced from each other, the reentering portions 20 of Figs. 3, 4 and 5, 21 of Fig. 7, and 22 of Figs. 9 and 10 being for instance separated by slots 23 issuing from circular or straight sides 24 or 25 of the reentering polygons.

The struck up portions have sharpened edges 26, as illustrated in the embodiments of Figs. 4, 5, 6, 7 and 8. The off-set or struck up elements are preferably given an arched or V-shaped cross-section, as illustrated in Figs. 4 to 8 at 27. The points of the reentrance portions may remain interconnected by center pieces 28 and 29, as shown in Figs. 5, 6 and 10 and 11, so that an injury of the user is prevented, these center pieces serving as finger guards. Protection for the operator may also be offered by not sharpening the points of the reentering portions, or by deliberately rendering the points dull,—rounding them or breaking them off,—so that the points become trapezoidal, as indicated at 30 in Fig. 7.

If the device is made of thin sheet metal, it may be provided with reinforcing ribs, or be arcuate or convex, as shown in Figs. 1 and 2. Some of the curved edges of the utensil, like the edge 16 may be sharpened like a knife for cutting and mincing purposes. For cutting carrots and the like in fancy shapes, one edge 17 may be provided with C-sectioned teeth. The handle 18 of the utensil of Figs. 1 and 2 is provided at its free, widened ends with an aperture 19 which allows the handle to be used for removing crown stoppers from bottles.

Naturally the grater may either have apertures which are all of the same shape or apertures of different shapes, and the apertures may be provided wtih offset edges either on one or on both sides in the grating direction. The apertures need not be arranged in regular rows as illustrated, but they may be staggered or arranged in geometrical groups.

What I claim is:

A grater comprising a sievelike sheet metal body with apertures, a plurality of sharp portions formed in said body and extending into one of said apertures, and a level center piece connecting the tips of said portions with each other in order to protect the fingers against injury.

FRANZ RAUCHFUSS.